United States Patent
Richardson et al.

(10) Patent No.: US 10,498,648 B1
(45) Date of Patent: Dec. 3, 2019

(54) PROCESSING PACKET DATA USING AN OFFLOAD ENGINE IN A SERVICE PROVIDER ENVIRONMENT

(71) Applicant: Amazon Technologies, Inc., Seattle, WA (US)

(72) Inventors: David R. Richardson, Seattle, WA (US); Marc John Brooker, Seattle, WA (US); Norbert Paul Kusters, Redmond, WA (US); Anthony Nicholas Liguori, Bainbridge Island, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/668,568

(22) Filed: Mar. 25, 2015

Related U.S. Application Data

(62) Division of application No. 14/668,557, filed on Mar. 25, 2015.

(51) Int. Cl.
*H04L 12/741* (2013.01)
*H04L 29/06* (2006.01)

(52) U.S. Cl.
CPC .............. *H04L 45/74* (2013.01); *H04L 69/22* (2013.01)

(58) Field of Classification Search
CPC combination set(s) only.
See application file for complete search history.

(56) References Cited

U.S. PATENT DOCUMENTS

| | | | |
|---|---|---|---|
| 5,862,136 A | 1/1999 | Irwin | |
| 5,930,359 A | 7/1999 | Kempke et al. | |
| 6,708,233 B1 | 3/2004 | Fuller et al. | |
| 7,836,124 B2 | 11/2010 | Saxena et al. | |
| 7,916,727 B2 | 3/2011 | Frank et al. | |
| 8,537,815 B2 * | 9/2013 | DiMambro | H04L 49/9042 370/389 |
| 8,706,971 B1 | 4/2014 | Nayak | |
| 2006/0056435 A1 | 3/2006 | Biran et al. | |
| 2006/0069800 A1 * | 3/2006 | Li | G06F 17/30206 709/232 |
| 2006/0239376 A1 * | 10/2006 | Nagaraj | H04L 1/0009 375/286 |
| 2007/0198467 A1 | 8/2007 | Wiser et al. | |

(Continued)

*Primary Examiner* — Yemane Mesfin
*Assistant Examiner* — Mon Cheri S Davenport
(74) *Attorney, Agent, or Firm* — Klarquist Sparkman, LLP

(57) ABSTRACT

A method for processing packet data in a service provider environment includes, by a network-enabled data processing device within a server computer of the service provider environment, receive packet data including header information and payload information. The packet header information can be separated from the payload information. The separated header information can be forwarded to a processor of the server computer for processing, without forwarding at least a portion of the payload information. Transforming instructions and at least one address of one or more storage locations can be received from the processor, based at least in part on the header information. The payload information can be transformed based on the transforming instructions. The transformed payload information can be stored in the one or more storage locations based on the at least one address.

18 Claims, 9 Drawing Sheets

(56) References Cited

U.S. PATENT DOCUMENTS

| | | |
|---|---|---|
| 2008/0013448 A1 | 1/2008 | Horie et al. |
| 2012/0250682 A1* | 10/2012 | Vincent .............. H04L 12/4633 |
| | | 370/390 |
| 2012/0314709 A1 | 12/2012 | Post et al. |
| 2014/0025770 A1 | 1/2014 | Warfield et al. |
| 2014/0189046 A1 | 7/2014 | Vezzuto et al. |
| 2015/0085863 A1 | 3/2015 | Wu et al. |
| 2015/0089134 A1 | 3/2015 | Mukherjee et al. |
| 2015/0295826 A1* | 10/2015 | Sitharaman ............. H04L 63/20 |
| | | 370/235 |
| 2016/0085701 A1 | 3/2016 | Mirza et al. |

* cited by examiner

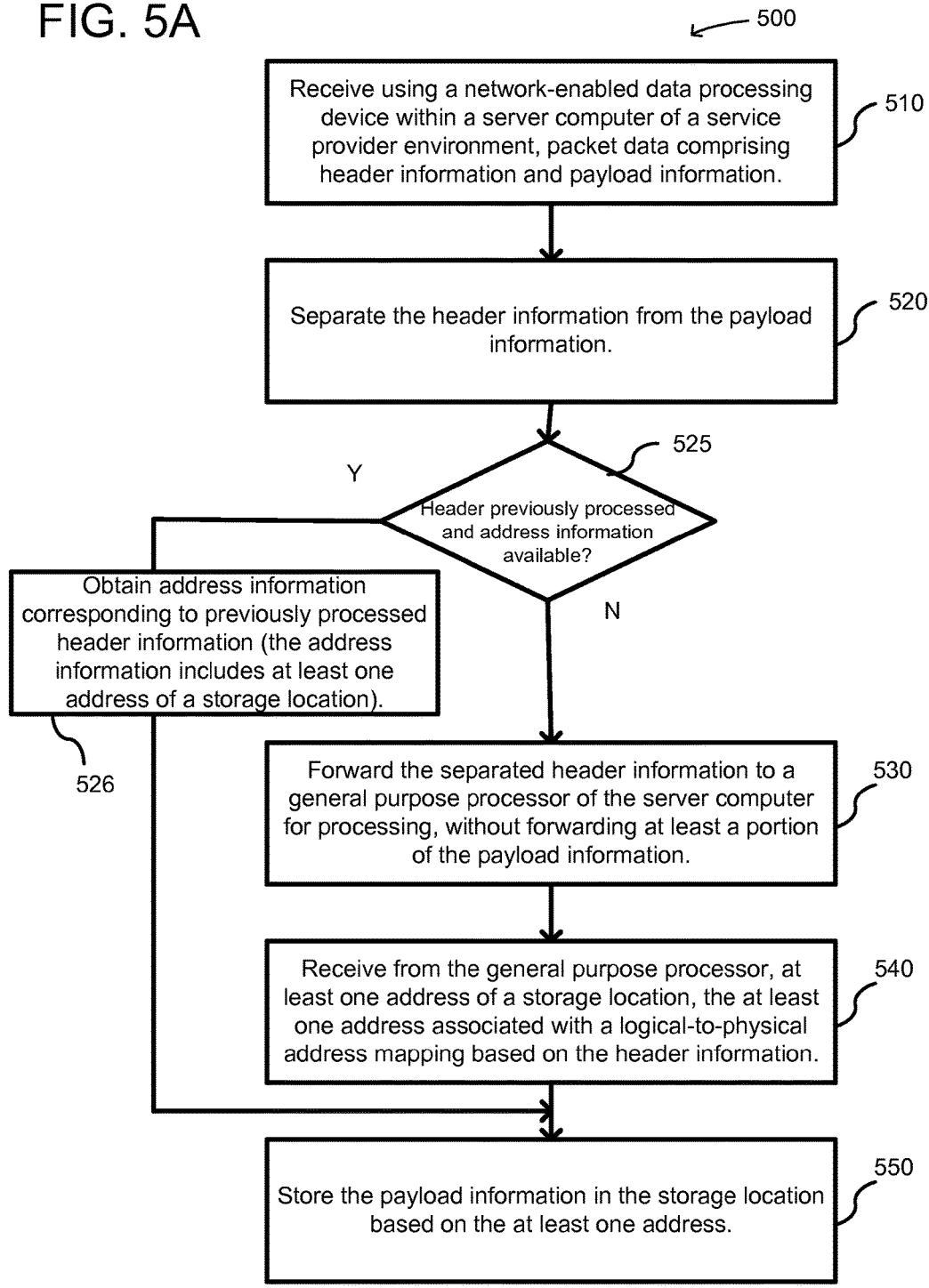

US 10,498,648 B1

PROCESSING PACKET DATA USING AN OFFLOAD ENGINE IN A SERVICE PROVIDER ENVIRONMENT

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing frequently offers block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. Processing of packetized data in such cloud computing environment can result in performance inefficiencies when the entire packet data is moved to different locations for processing and/or storage.

BRIEF DESCRIPTION OF THE DRAWINGS

FIG. 5A shows a flow chart of a method according to a first embodiment for processing packet data using an offload engine.

DETAILED DESCRIPTION

A network data processing device (e.g., a network card with DMA/offload engine functionalities) may be used for processing packet data. As packet data is received at the network data processing device (NDPD), header and payload data can be separated. The NDPD can keep the payload data and forward the header information for separate processing to a processor such as, for example, a general purpose processor (GPP), a special purpose processor (SPP), and/or a mapping unit (MU) for processing. The processor may process the header information and obtain address information using the header information (e.g., using mapping, such as logical-to-physical mapping). The address information can include physical address information identifying one or more storage locations (e.g., disk number or memory locator) as well as an address associated with such storage location (e.g., a media access control, or MAC address, an IP address, a disk address, a volume ID, a block number, a table address, a logical address, a virtual address, an address range, and/or a combination thereof) where the payload may be stored or sent for further processing. The processor may send back the one or more addresses and, optionally, transforming information (e.g., erasure coding information or other information used to perform a transforming operation on the data, such as segmentation, compression, encryption, alignment, validation, and/or re-encryption) to the NDPD. The NDPD may forward the payload information to a target (e.g., another network or a storage device) based on the received address information. Optionally, if the transforming operation includes an erasure code, the payload data can be erasure coded, including segmented, and each segment can be encrypted prior to forwarding. Additionally, the NDPD can generate a new header for the payload data (e.g., a new header for each segment if the payload is erasure-coded), where the new header may be associated with one or more protocols used for communicating the payload data (e.g., UDP, TCP/IP, InfiniBand, and so forth).

Figure 1:
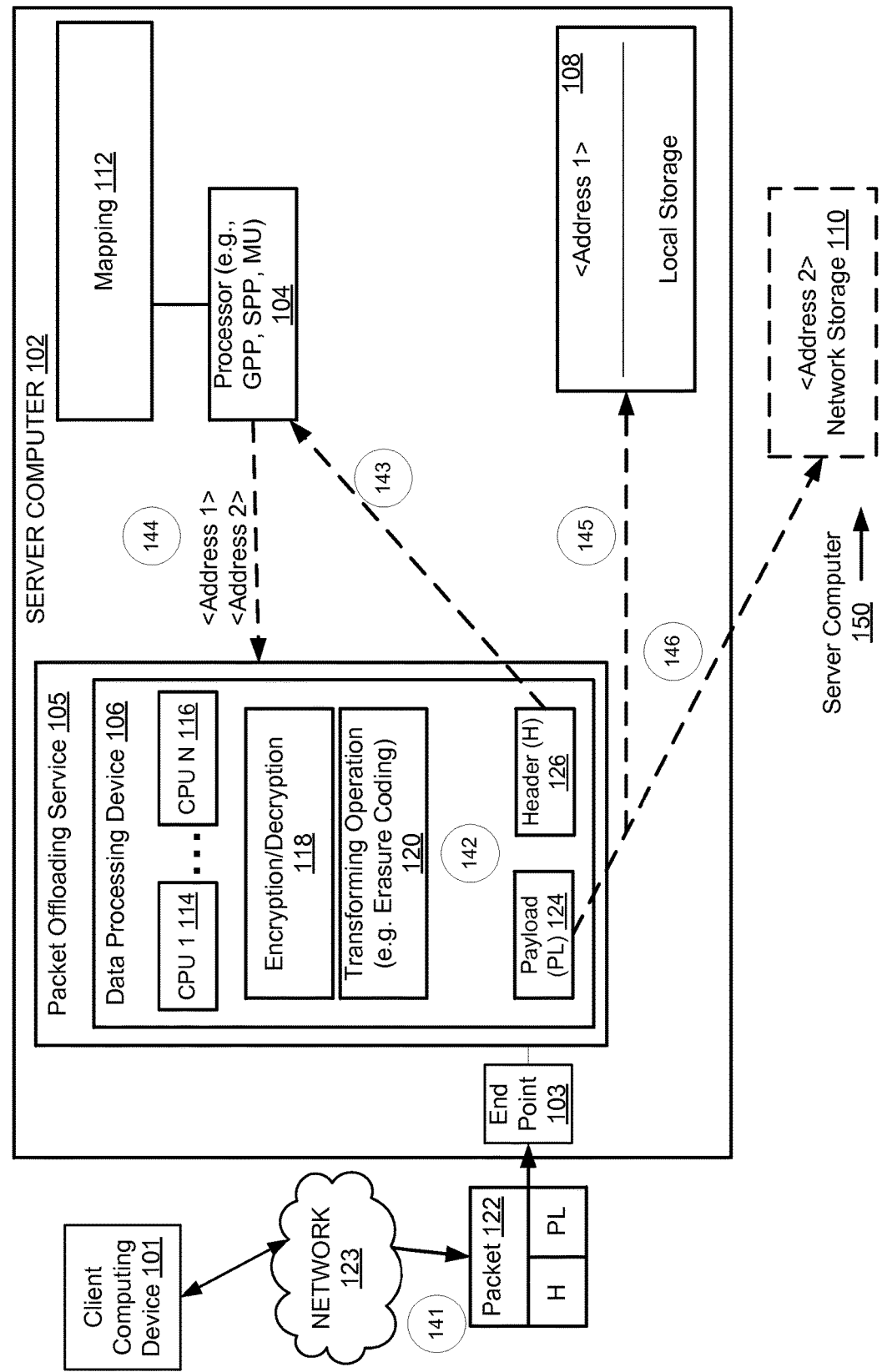
FIG. 1 shows a system diagram according to one embodiment for processing packet data using an offload engine in a service provider environment.

FIG. 1 shows a system diagram according to one embodiment for processing packet data using an offload engine in a service provider environment. It should be understood, however, that processing packet data using an offload engine as described herein, for example using the NDPD, need not be in a service provider environment and may be done on servers outside of a service provider, such as private or local servers. Referring to FIG. 1, the illustrated network environment may include a server computer 102 (of a service provider 100) in communication with client computing device, such as client computing device 101, via the network 123. The service provider 100 may be a multi-tenant cloud network environment where one or more clients (e.g., a user of the client computing device 101) may run one or more volumes (e.g., storage volumes) on one or more server computers, such as server computer 102 (even though only a single server computer 102 is illustrated in FIG. 1, multiple server computers can be used by the service provider). The server computers (e.g., 102) may be, for example, client servers operated by (or on behalf of) one or more clients of the service provider. The service provider may further include a packet offloading service (POS) 105 running on the server computer 102, and network storage 110. The server computer 102 may also comprise a network data processing device (NDPD) 106 as part of the packet offloading service 105, a processor 104, a mapping module 112, an endpoint 103, and local storage 108. Even though the endpoint 103 and the packet offloading service 105 are illustrated as implemented within the server computer 102, the disclosure is not limited in this regard. One or more blocks within the server computer 102 (e.g., the endpoint 103 and the packet offloading service 105) may be implemented in hardware and/or software as stand-alone services and/or as part of one or more other server computers.

The client computing device 101 may be used for providing access to the POS 105 and the service provider 100. In an illustrative embodiment, the client computing device 101 can correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In an illustrative embodiment, the client computing device 101 includes necessary hardware and/or software components for establishing communications over the communication network 123, such as a wide area network or local area network. For example, the client computing device 101 may be equipped with networking equipment and browser software applications that facilitate communications via the Internet or an intranet with one or more of the server computers (e.g., 102) in the service provider 100. The client computing device 101 may have varied local computing resources such as central processing units and architectures, memory, mass storage, graphics processing units (GPUs), communication network availability and bandwidth, etc.

The endpoint 103 may comprise suitable logic, circuitry, interfaces, and/or code and may be operable to provide authentication of one or more service provider clients (e.g., user of the client device 101) and facilitate communication between the client computing device 101 and one or more server computers (e.g., 102) in the service provider environment 100. The endpoint 103 may comprise one or more of a secure gateway, router, and/or another network device operable to use one or more communication links associated with at least one of a plurality of communication protocols. Additionally, the endpoint 103 may be a cloud endpoint located in one of a plurality of separate regions (e.g., separate geographic regions) associated with the service provider 100.

The packet offloading service (POS) 105 may comprise suitable logic, circuitry, interfaces, and/or code and may be operable to provide direct memory access (DMA) and offloading functionalities associated with data received by the service provider 100 (e.g., packet data 122 received from the client computing device 101 via the network 123) using the network data processing device (NDPD) 106. The NDPD 106 may be, for example, a network card with enhanced processing functions, such as DMA/offload related functions as described herein. The NDPD 106 may comprise processors 114, . . . , 116 operable to perform one or more of the DMA/offload functions, such as separating header and payload data from received packet data (as well as combining header and payload data into packet data), providing DMA-access for reading/storing packet data, segmenting data during erasure coding, encrypting/decrypting data, and so forth. The NDPD 106 may further comprise an encryption/decryption block 118, and a transforming operation block 120. The encryption/decryption block 118 may comprise suitable logic, circuitry, interfaces, and/or code and may be operable to perform encryption/decryption functions on packet data (e.g., payload, header, erasure coded segments, and so forth). The transforming operation block 120 may comprise suitable logic, circuitry, interfaces, and/or code and may be operable to perform one or more transforming operations (e.g., segmentation, compression, encryption, erasure coding, replication, validation, re-encryption, alignment, and so forth) based on transforming information (e.g., 210) received from the processor 104. In this regard, the transforming information (e.g., 210) may include transforming information needed by the transforming operation block 120 to perform the corresponding transforming operation. For example, the transforming information may include one or more erasure codes, and the transforming operation block 120 may perform erasure coding based on the one or more received erasure codes (e.g., as provided by the processor 104 and as described in greater detail in FIG. 2).

The processor 104 may comprise suitable logic, circuitry, interfaces, and/or code and may be operable to provide processing functions within the server computer 102, including processing header information provided by the POS 105. The processor 104 can be a general purpose processor (GPP) configured to process header and/or payload data, a specialized purpose processor (or SPP, for specifically processing header information), a mapping unit (MU) or cache (e.g., for storing pre-determined mapping data providing address information and/or transforming instructions), and/or any combination thereof. If a cache is utilized and such a cache does not contain the mapping data for providing address information and/or transforming instructions, for example because of processing a new header, the cache may be updated with new address information and/or transforming instructions once such information and instructions have been determined, for example by using a GPP or SPP. The processor 104 may further use (or implement) the mapping block 112 to analyze received header information and generate address information (e.g., by mapping logic data within the header to one or more physical addresses using the mapping block 112).

Figure 3:
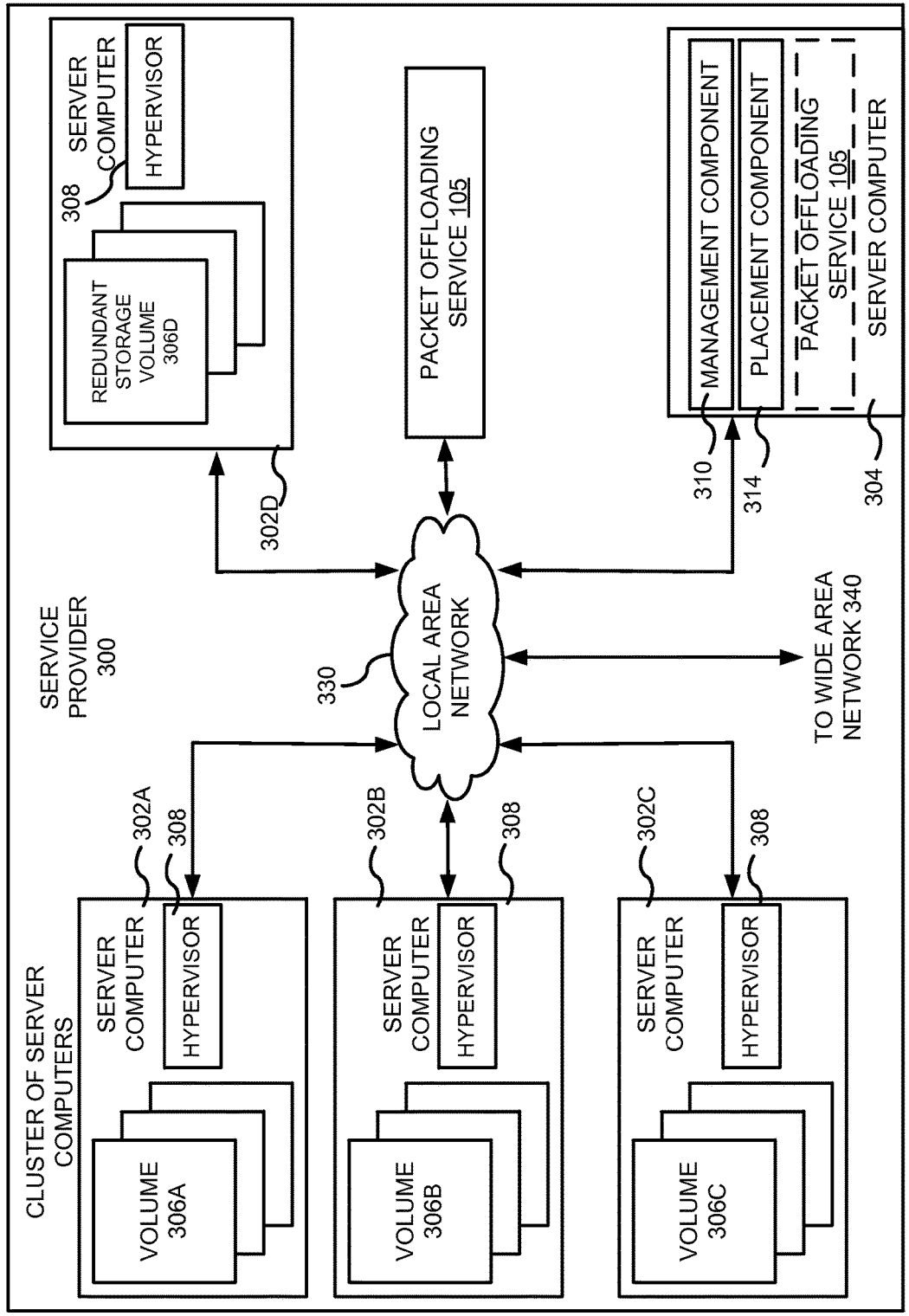
FIG. 3 is an example service provider environment showing the use of a packet offloading service.

In accordance with an example embodiment of the disclosure, the POS 105 may be implemented as a stand-alone service within the service provider 100 (e.g., as illustrated in FIG. 3) using the NDPD 106, or it may be implemented as a code library (i.e., software) within one or more of the server computers (e.g., 102). Also, the NDPD 106 could be coupled to standalone servers outside of service provider in order to implement the data packet processing described herein.

In an example network-to-disk operation, the client computing device 101 may communicate packet data (at 141), such as packet 122, to server computer 102 via endpoint 103. The network data processing device 106 within the POS 105 may receive the packet 122 and may use one or more of the processors 114, . . . , 116 to separate (at 142) the payload 124 from the header 126. The NDPD 106 may then send (at 143) the header 126 to the processor 104 for processing, without sending at least a portion of the payload 124 to the processor 104. The processor 104 may process the header data 126 using the mapping block 112. For example, the mapping block 112 may use logical-to-physical mapping to map logical data within the header 126 to generate address information (e.g., addresses 1-2).

The address information may include one or more physical addresses of a storage location (e.g., a disk number) and/or an address within the storage location (e.g., MAC address, an IP address, a disk address, a volume ID, a block number, a table address, a logical address, a virtual address, an address range, and/or a combination thereof). The storage locations associated with the address information may include local storage (e.g., 108) and/or external network storage (e.g., network storage 110 at server computer 150). The local storage 108 and the external storage 110 may include non-volatile memory, disk storage and/or other types of storage media. The processor 104 may communicate (at 144) the address information back to the NDPD 106. The payload data 124 may be communicated (at 145) to the local storage 108 for storage at a location associated with the address <Address 1> received from the GPP 104. The payload data 124 may also be communicated (at 146) to the external storage 110 for storage at a location associated with the address <Address 2> received from the processor 104. In an example embodiment, the NDPD 106 may encrypt the payload 124 prior to communicating the data to storage 108 and/or 110.

The network storage 110 may be redundant storage and payload data 124 may be automatically stored in local storage 108 and then replicated in the redundant storage 110.

In accordance with an example embodiment of the disclosure, the physical address locations (<Address 1> and <Address 2>) can be stored by the NDPD 106 (e.g., on-chip or in another dedicated storage). When stored data is requested, the NDPD 106 may use the address information to access and retrieve the payload information from storage, decrypt it if was encrypted, generate a header and assemble the packet (e.g., 122).

Figure 2:
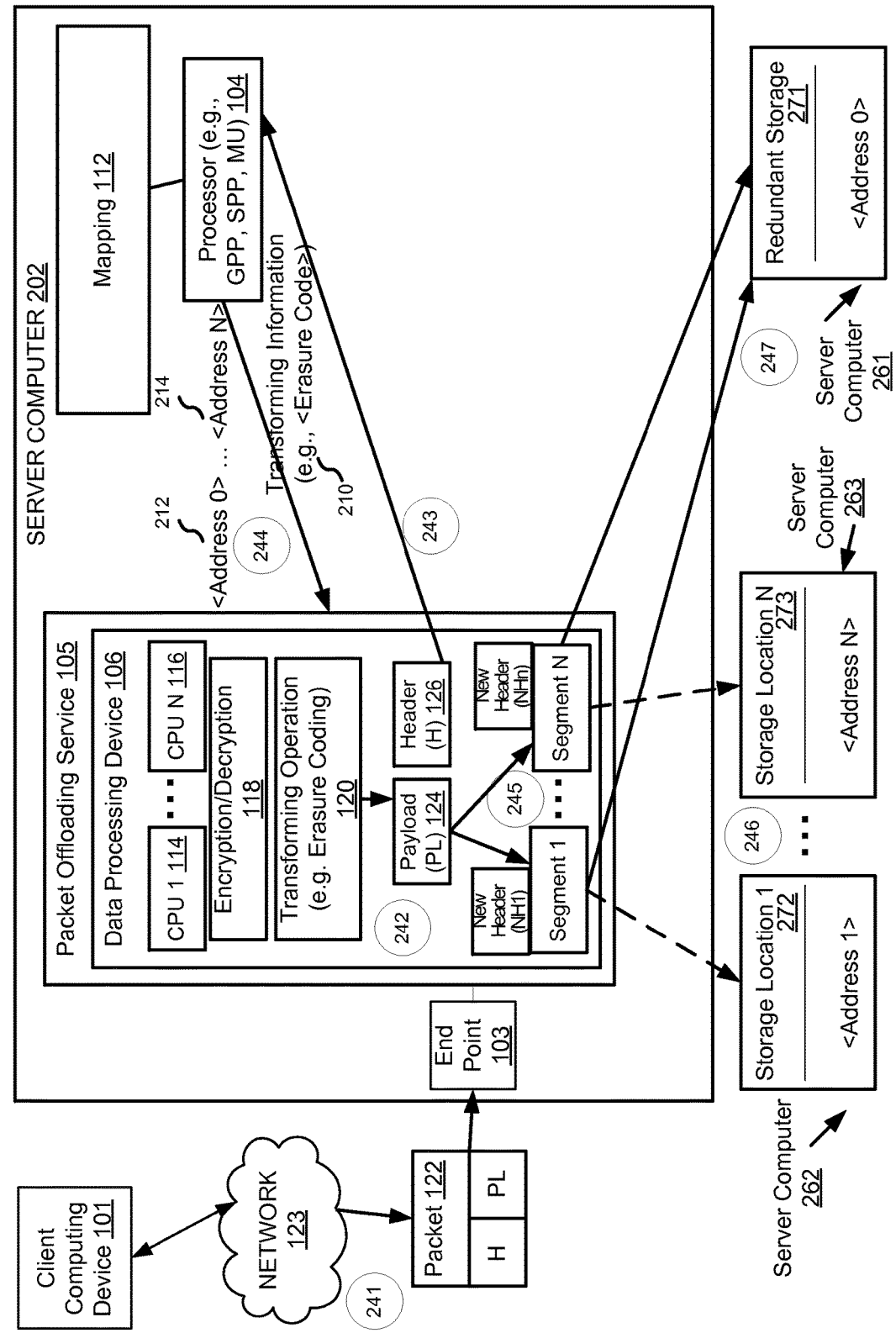
FIG. 2 shows a system diagram according to another embodiment for processing packet data using an offload engine in a service provider environment.

FIG. 2 shows a system diagram according to another embodiment for processing packet data using an offload engine in a service provider environment. Referring to FIG. 2, the illustrated network environment may include a server computer 202 (of a service provider 200) in communication with client computing device, such as client computing device 101, via the network 123 and the endpoint 103. The server computer 202 is similar in many respects to the server computer 102 of FIG. 1, except FIG. 2 illustrates transforming operation functionalities (e.g., erasure coding) during network-to-network offload processing of packet data.

In an example network-to-network operation, the client computing device 101 may communicate packet data (at 241), such as packet 122, to server computer 202 via endpoint 103. The network data processing device 106 within the POS 105 may receive the packet 122 and may use one or more of the processors 114, . . . , 116 to separate (at 242) the payload 124 from the header 126. The NDPD 106 may then send (at 243) the header 126 to the processor 104 for processing, without sending at least a portion of the payload 124 to the processor 104. The processor 104 may process the header data 126 using, for example, the mapping block 112. For example, the mapping block 112 may use logical-to-physical mapping to map logical data within the header 126 to generate address information (e.g., addresses 0-N). In other instances, the processor 104 may include cache with previously determined mapping data that includes address information. The header data may be mapped with the previously determined mapping data to obtain corresponding address information.

The address information (e.g., 212, . . . , 214) may include one or more physical addresses of a storage location (e.g., a disk number or memory identifier) and/or an address location within the storage location (e.g., MAC address, an IP address, a disk address, a volume ID, a block number, a table address, a logical address, a virtual address, an address range, and/or a combination thereof). The storage locations associated with the address information may include local storage within the server computer 202 (e.g., similar to storage 108 illustrated in FIG. 1) and/or external network storage locations (e.g., network storage locations 271, . . . , 273, such as disk drives, at server computers 261, . . . , 263 respectively). The local storage 108 and the external storage 271, . . . , 273 may include non-volatile memory, disk storage and/or other types of storage media. The processor 104 may communicate (at 244) the physical address information 212, . . . , 214 (addresses <Address 0>, . . . , <Address N>) back to the NDPD 106.

At (244), the processor 104 may also communicate transformation information 210 to the transforming operations block 120 within the NDPD 106. The transforming operation block 120 may comprise suitable logic, circuitry, interfaces, and/or code and may be operable to perform one or more transforming operations (e.g., segmentation, compression, encryption, erasure coding, replication, validation, re-encryption, alignment, and so forth) based on transforming information 210 received from the processor 104. In this regard, the transforming information 210 may include transforming information needed by the transforming operation block 120 to perform the corresponding transforming operation. For example, the transforming information 210 may include one or more erasure codes, and the transforming operation block 120 may then perform erasure coding based on the one or more received erasure codes. More specifically, at 245, the transforming operation block 120 may erasure code the payload 124 using the transforming information (e.g., erasure code) 210 received from the processor 104. In this regard, the payload 124 may be separated into segments 1, . . . , N during the erasure coding. In an example embodiment, one or more of the generated segments may be packaged with a new header (e.g., NH1, . . . , NHn). The new headers can be, for example, one or more of a User Datagram Protocol (UDP) header, a Transmission Control Protocol/Internet Protocol (TCP/IP) header, an InfiniBand (IB) header, and/or another type of header associated with a communication protocol. The NDPD 106 may also build/implement a communication stack (e.g., a TCP stack, an InfiniBand stack, and so forth) within one or more of the segments and/or the new headers, based on the type of communication link used to communicate the segments to the storage locations.

At 246, the segmented payload (i.e., segments 1, . . . , N with corresponding new headers NH1, . . . , NHn) can be communicated to (stored in) storage locations 272, . . . , 273 identified by physical addresses <Address 1>, . . . , <Address N>. Optionally, the segmented payload data 124 (i.e., segments 1, . . . , N with any new headers) may also be communicated (at 247) to the redundant/replication storage location 271 using the physical address <Address 0> received from the GPP 104. Even though a single replication storage location 271 at a replication server 261 is illustrated in FIG. 2, multiple replication storage location (at one or more replication servers) can be used for replicating at least one of the segments 1, . . . , N.

In an example embodiment, the NDPD 106 may use the encryption/decryption module 118 to encrypt the segments 1, . . . , N and/or the new headers NH1, . . . , NHn prior to communicating the segment/header data to any of the storage locations (e.g., local storage 108 and/or external storage 271, . . . , 273).

FIG. 3 is an example service provider environment showing the use of a packet offloading service. By way of background, the service provider 300 (e.g., the cloud provider) is capable of delivery of computing and storage capacity as a service to a community of end recipients. In an example embodiment, the compute service provider can be established for an organization by or on behalf of the organization. That is, the service provider 300 may offer a "private cloud environment." In another embodiment, the service provider 300 supports a multi-tenant environment, wherein a plurality of customers operate independently (i.e., a public cloud environment). Generally speaking, the service provider 300 can provide the following models: Infrastructure as a Service ("IaaS"), Platform as a Service ("PaaS"), and/or Software as a Service ("SaaS"). Other models can be provided. For the IaaS model, the service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the service provider 300 using networked client devices, such as desktop computers, laptops, tablets, smartphones, etc. running web browsers or other lightweight client applications. Those skilled in the art will recognize that the service provider 300 can be described as a "cloud" environment.

The particular illustrated service provider 300 includes a plurality of server computers 302A-302D. While only four server computers are shown, any number can be used, and large centers can include thousands of server computers. The server computers 302A-302D can provide computing resources for storage volumes 306A-306D. The storage volumes can be portion of the server computer's hard drive and can be divisible so that different customers can use different portions (volumes) of the hard drive. Each of the servers 302A-302D can be configured to execute a hypervisor 308 or another type of program configured to enable the multiple volumes 306 on a single server.

One or more server computers 304 (e.g., as a management server plane) can be reserved for executing software components for managing the operation of the server computers 302 and the volumes 306. For example, the server computer 304 can execute a management component 310. In some embodiments, a customer can access the management component 310 to configure various aspects of the operation of the volumes 306 purchased by the customer. For example, the customer can purchase, rent or lease volumes and make changes to the configuration of the volumes. A placement component 314 can be used to assist customers in the deployment of new volumes 306 of computing resources. The placement component can have access to account information associated with the volumes, such as who is the owner of the account, credit card information, country of the owner, etc. The placement component 314 can receive a configuration from a customer that includes data describing how new volumes 306 should be configured.

A network 330 can be utilized to interconnect the server computers 302A-302D and the server computer 304. The network 330 can be a local area network (LAN) and can be connected to a Wide Area Network (WAN) 340 so that end users can access the service provider 300. It should be appreciated that the network topology illustrated in FIG. 3 has been simplified and that many more networks and networking devices can be utilized to interconnect the various computing systems disclosed herein.

In accordance with an example embodiment of the disclosure, the service provider 300 may further include the packet offloading service 105 with functionalities as described herein. The packet offloading service 105 may be implemented as a stand-alone service (e.g., as a separate network-enabled device) or as part of a separate server computer. For example, the packet offloading service 105 may be implemented as part of the management server 304. The packet offload service 105 can communicate through the network 330 with the server computers 302 so as to access any of the volumes 306, which can be controlled by different customers of the service provider 300. The packet offloading service 105 may keep track of which volumes are used by which customer, as well as specific portions (e.g., physical address locations) used in a given volume by a specific customer. Additionally, one or more of the volumes (e.g., volume 306D) may be used as a redundant storage volume (e.g., similar to redundant storage location 271 in FIG. 2)

Figure 4:
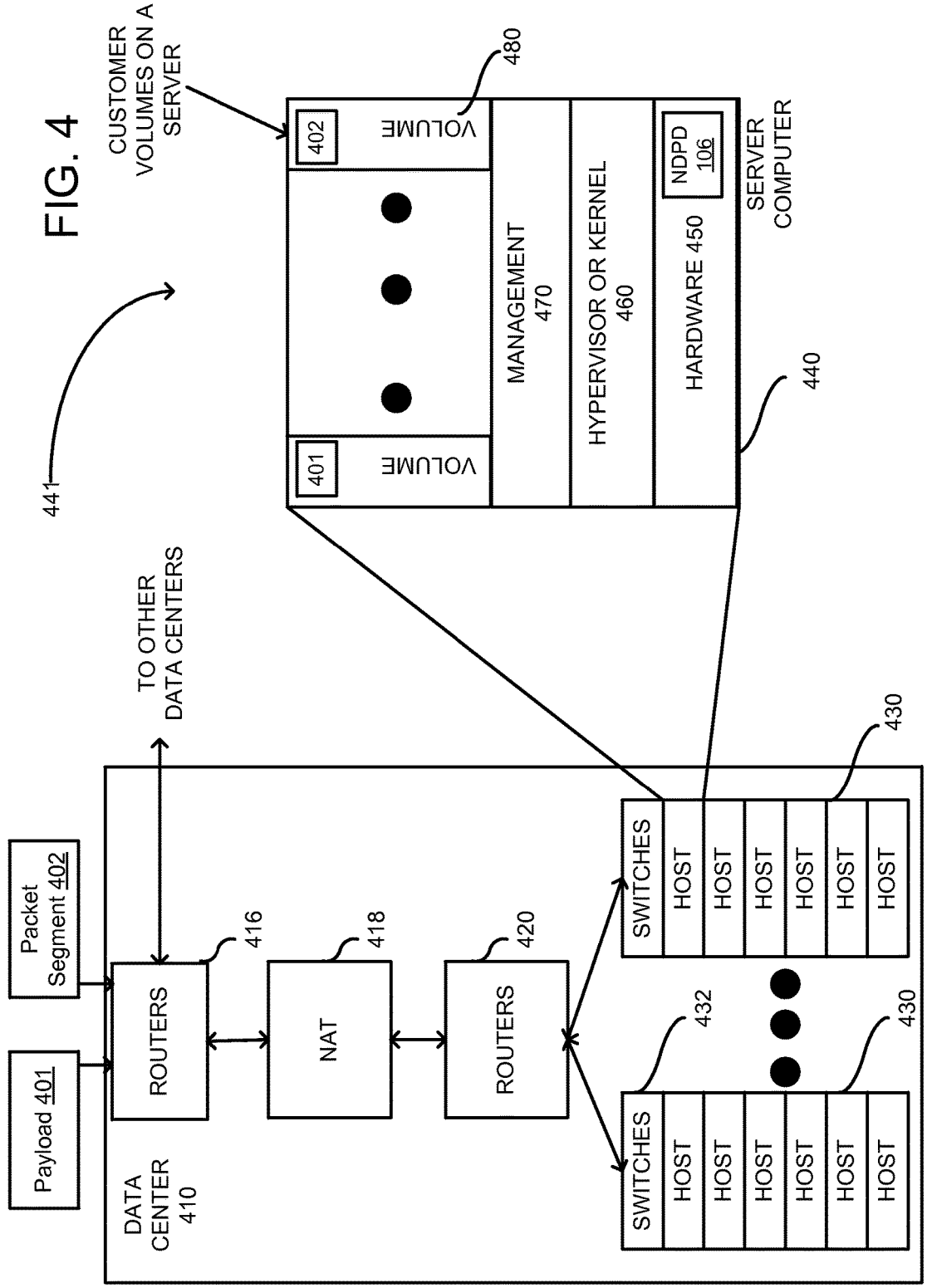
FIG. 4 shows an example of a plurality of host computers, routers, and switches, which are hardware assets used for maintaining storage volumes upon the server computers.

FIG. 4 shows an example of a plurality of host computers, routers, and switches, which are hardware assets used for maintaining storage volumes upon the server computers. The storage volumes 480 can be distributed across a plurality of data centers, such as data center 410, coupled together by routers 416. The routers 416 read address information in a received packet and determine the packet's destination. The received packet may include payload 401 and/or packet segment 402, which may be similar to payload 124 or one or more of segments 1, N, respectively. Additionally, the payload 401 and the packet segment 402 may include a new header (e.g., as described herein above in reference to FIG. 2).

If the router decides that a different data center contains a host server computer, then the packet is forwarded to that data center. If the packet is addressed to a host in the data center 410, then it is passed to a network address translator (NAT) 418 that converts the packet's public IP address to a private IP address. The NAT 418 also translates private addresses to public addresses that are bound outside of the datacenter 410. Additional routers 420 can be coupled to the NAT 418 to route packets to one or more racks 430 of host server computers. Each rack 430 can include a switch 432 coupled to multiple host server computers. A particular host server computer 440 is shown in an expanded view at 441.

Each host 440 has underlying hardware 450 including one or more CPUs, memory, storage devices (e.g., a hard drive, solid state drive), etc. The hardware layer 450 may include a network data processing device (NDPD), such as NDPD 106 with functionalities disclosed herein. Running a layer above the hardware 450 is a hypervisor or kernel layer 460. The hypervisor or kernel layer 460 can be classified as a type 1 or type 2 hypervisor. A type 1 hypervisor runs directly on the host hardware 450 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 470 can be part of the hypervisor or separated therefrom and generally includes device drivers needed for accessing the hardware 450. The volumes 480 are logical divisions of isolation by the hypervisor. Each volume 480 can be allocated its own portion of the hardware layer's storage and is independent of the other volumes. The volumes 480 may be similar to the volumes 306 (in FIG. 3) and may be used to store data offloaded by the NDPD 106, such as the payload 401 and/or one or more segments 402 (e.g., segments generated by erasure coding a packet payload, as described in FIG. 2).

FIG. 5A shows a flow chart of a method according to a first embodiment for processing packet data using an offload engine. Referring to FIGS. 1 and 5A, the example method 500 may start at 510, when packet data comprising header information and payload information, is received using a network-enabled data processing device within a server computer of a service provider environment. For example, packet 122 (which includes payload 124 and header 126) can be received at the network-enabled data processing device 106 from the client computing device 101 via the network 123 and the endpoint 103. At 520, the header information is separated from the payload information. For example, the NDPD 106 may use one or more of the processors 114, . . . , 116 to separate the header 126 from the payload 124. At 525, it may be determined whether the header information has been previously processed and whether address information from the previous processing is available. If the header information (e.g., 126) has been previously processed and address information from such previous processing is available, then at 526, the address information may be accessed/obtained. For example, processor 104 may include a cache storing address information based on previous processing of the header information 126. Then the header information may be used to match the available address information (e.g., Address 1 and Address 2) and obtain such address information. Processing may continue at block 550.

If the header has not been previously processed, then at 530, the separated header information is forwarded to a processor of the server computer for processing, without forwarding at least a portion of the payload information. For example, the separated header information 126 is forwarded to the processor 104 for additional processing, without one or more portions of the payload 124 being forwarded with the header 126. More specifically, the NDPD 106 can keep the payload 124 on-chip, or store it temporarily, while the header 126 is being processed by the processor 104.

At 540, at least one address of a storage location is received from the processor. In addition, this information may be used to update the cache. For example, the processor 104 can use the mapping module 112 to perform address mapping and obtain at least one address (e.g., <Address 1> and <Address 2>) using the header information 126. The generated addresses can include information identifying one or more storage locations (e.g., disk number or memory locator) as well as an address associated with such storage location (e.g., a media access control, or MAC address, an IP address, a disk address, a volume ID, a block number, a table address, a logical address, a virtual address, an address range, and/or a combination thereof). At 550, the payload information is stored in the storage location based on the at least one address. For example, the one or more addresses received from the processor 104 may include an address of a local storage (e.g., on-chip memory or disk drive) 108, as well as an address of one or more external storage locations (e.g., 110). At least one of the external storage locations can be redundant storage, where the packet data (e.g., payload 124) may be automatically replicated/stored, concurrently with (or subsequently) storing the packet data at another storage location (e.g., local or external storage).

Figure 5B:
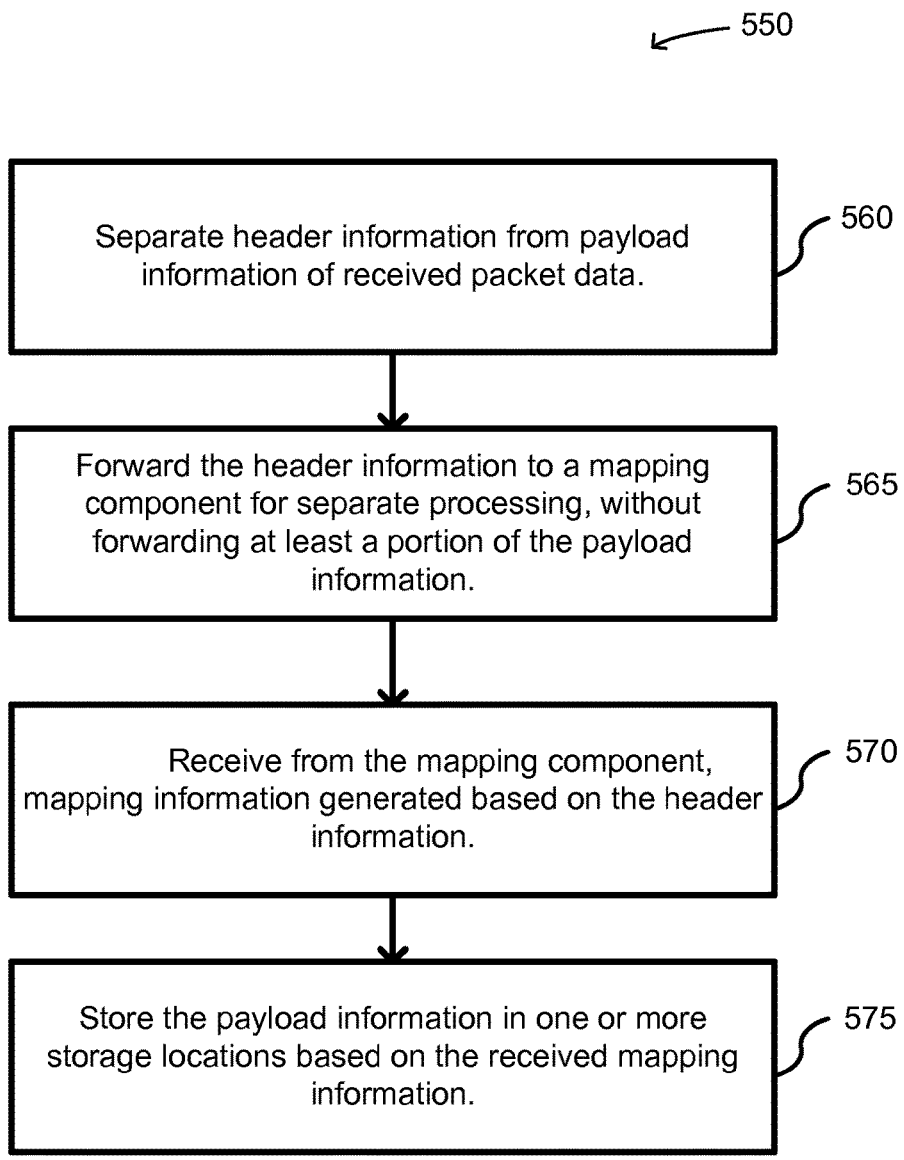
FIG. 5B shows a flow chart of a method according to a second embodiment for processing packet data using an offload engine.

FIG. 5B shows a flow chart of a method according to a second embodiment for processing packet data using an offload engine. Referring to FIGS. 1 and 5B, the example method 555 may start at 560, when header information is separated from payload information of received packet data. For example, packet 122 (which includes payload 124 and header 126) can be received at the network-enabled data processing device 106 from the client computing device 101 via the network 123 and the endpoint 103. The header information can be separated from the payload information. For example, the NDPD 106 may use one or more of the processors 114, . . . , 116 to separate the header 126 from the payload 124.

At 565, the header information can be forwarded to a mapping component for separate processing, without forwarding at least a portion of the payload information. For example, the processor 104 can be a mapping component performing mapping functionalities (e.g., a general purpose processor, a special purpose processor for processing header data, and/or cache memory storing pre-processed header information, including mapping information such as address information). The header 126 can be forwarded to the mapping component 104. At 570, the NDPD 106 may receive from the mapping component (e.g., 104), mapping information generated based on the header information. For example, the mapping information may include the address information (Address 1 and Address 2) associated with one or more storage locations. At 575, the payload information can be stored in one or more storage locations based on the received mapping information. For example, the mapping information received from the mapping component 104 may include an address of a local storage (e.g., on-chip memory or disk drive) 108, as well as an address of one or more external storage locations (e.g., 110). At least one of the external storage locations can be one or more redundant/replication storage locations at one or more replication servers, where the packet data (e.g., payload 124) may be automatically replicated/stored, concurrently with (or subsequently) storing the packet data at another storage location (e.g., local or external storage).

Figure 6A:
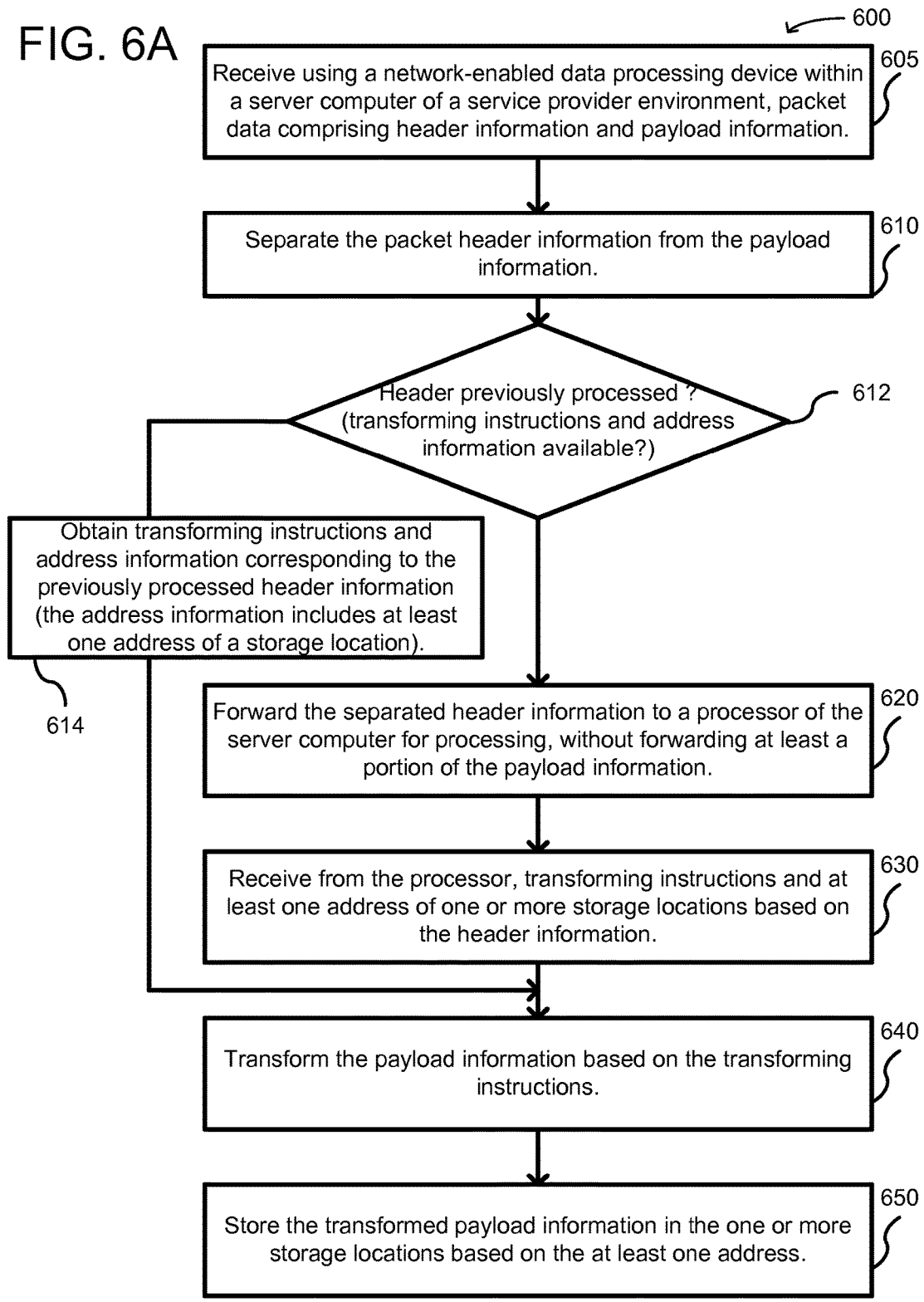
FIG. 6A shows a flow chart of a method according to a third embodiment for processing packet data using an offload engine.

FIG. 6A shows a flow chart of a method according to a third embodiment for processing packet data using an offload engine. Referring to FIGS. 2 and 6A, the example method 600 may start at 605, when packet data (122) including header information (126) and payload information (124) is received by a network-enabled data processing device (NDPS 106) of a packet offloading service (POS) 106. At 610, the packet header information is separated from the payload data in the received packet, using the packet offloading service (e.g., POS 105) running in a server computer (e.g., 202) of a service provider environment (e.g., 200). For example, packet 122 (which includes payload 124 and header 126) can be received at the network-enabled data processing device 106 from the client computing device 101 via the network 123 and the endpoint 103. The NDPD 106 may use one or more of the processors 114, . . . , 116 to separate the header 126 from the payload 124.

At 612, it may be determined whether the header information has been previously processed, and whether transforming information/instructions and address information from the previous processing is available, for example from the cache. If the header information (e.g., 126) has been previously processed and address information and transforming instructions from such previous processing are available, then at 614, the address information and the transforming instructions may be accessed/obtained. For example, processor 104 may include a cache storing address information based on previous processing of the header information 126. Then the header information may be used to match and obtain the available transforming instructions and address information (e.g., Address 1 and Address 2). The transforming instructions (e.g., 210) can include one or more instructions used for performing a transforming operation on a payload (examples of such transforming operations include segmentation, compression, encryption, erasure coding, alignment, validation, and/or re-encryption). Processing may continue at block 640.

At 620, the separated header information is forwarded to a processor of the server computer for processing, without forwarding at least a portion of the payload information. For example, after the separated header information 126 is forwarded to the GPP 104 for additional processing, without one or more portions of the payload 124 being forwarded with the header 126. More specifically, the NDPD 106 can keep the payload 124 on-chip, or store it temporarily, while the header 126 is being processed by the processor 104. At 630, at least one physical address of one or more storage locations and transforming instructions (e.g., erasure coding data) are received from the general purpose processor. For example, the GPP 104 can use the mapping module 112 to perform mapping (e.g., logical-to-physical address mapping) and obtain addresses 212, . . . , 214 (e.g., <Address 0>, . . . , <Address N>) and transforming information/instructions 210 (e.g., erasure coding information such as an erasure code or information identifying an erasure code, as well as other information used for one or more other transforming operations on the payload) using the header information 126. The generated addresses 212, . . . , 214 can include information identifying one or more storage locations 271, . . . , 273 (e.g., disk number or memory locator) as well as a physical address associated with such storage location (e.g., a media access control, or MAC address, an IP address, a disk address, a volume ID, a block number, a table address, a logical address, a virtual address, an address range, and/or a combination thereof).

At 640, the payload information is transformed based on the transforming instructions 210. For example, if the transforming instructions 210 include an erasure code, the erasure coding block 120 may erasure code the payload 124 using the erasure code 210 received from the processor 104. In this regard, the payload 124 may be separated into segments 1, . . . , N during the erasure coding. In an example embodiment, one or more of the generated segments may be packaged with a new header (e.g., NH1, . . . , NHn). The new headers can be, for example, one or more of a User Datagram Protocol (UDP) header, a Transmission Control Protocol/Internet Protocol (TCP/IP) header, an InfiniBand (IB) header, and/or another type of header associated with a communication protocol. The NDPA 106 may also build/implement a communication stack (e.g., a TCP stack, an InfiniBand stack, and so forth) within one or more of the segments and/or the new headers, based on the type of communication link used to communicate the segments to the storage locations.

At 650, the transformed payload information is stored in the one or more storage locations based on the at least one address. For example, the segmented payload (i.e., segments 1, . . . , N with corresponding new headers NH1, NHn) can be communicated to (stored in) storage locations 272, . . . , 273 identified by physical addresses <Address 1>, . . . , <Address N>. Optionally, the segmented payload data 124 (i.e., segments 1, . . . , N with any new headers) may also be communicated (at 247) to the redundant/replication storage location 271 using the address <Address 0> received from the processor 104 (replication storage may be used in connection with one or more replication servers, each being addressed separately). In an example embodiment, the NDPD 106 may use the encryption/decryption module 118 to encrypt the segments 1, . . . , N and/or the new headers NH1, . . . , NHn prior to communicating the segment/header data to any of the storage locations (e.g., local storage 108 and/or external storage 271, . . . , 273).

Figure 6B:
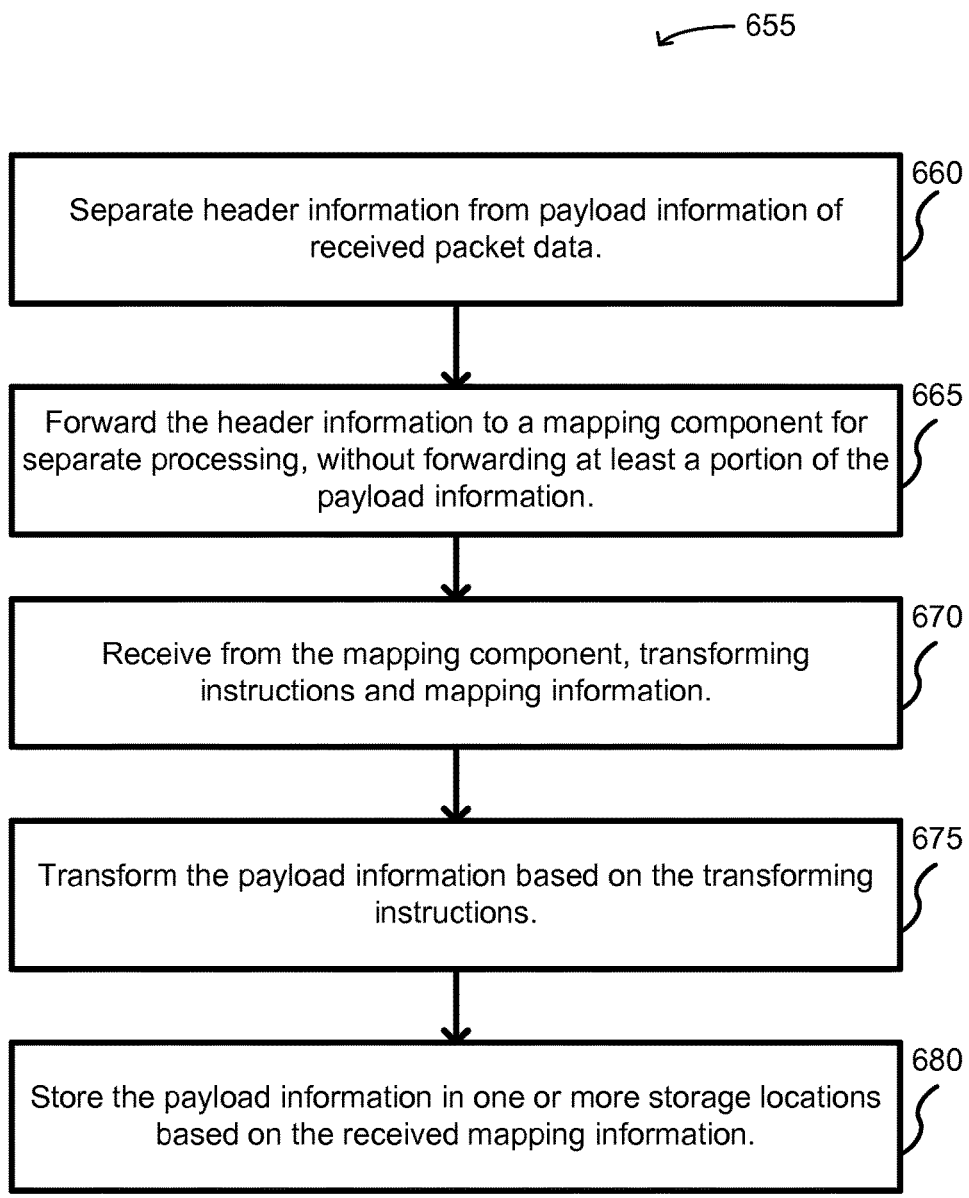
FIG. 6B shows a flow chart of a method according to a fourth embodiment for processing packet data using an offload engine.

FIG. 6B shows a flow chart of a method according to a fourth embodiment for processing packet data using an offload engine. Referring to FIGS. 2 and 6B, the example method 655 may start at 660, when packet header information is separated from payload data in a received packet, using a packet offloading service (e.g., POS 105) running in a server computer (e.g., 202). For example, packet 122 (which includes payload 124 and header 126) can be received at the network-enabled data processing device 106 from the client computing device 101 via the network 123 and the endpoint 103. The NDPD 106 may use one or more of the processors 114, . . . , 116 to separate the header 126 from the payload 124.

At 665, the separated header information is forwarded to a mapping component (e.g., 104) for separate processing, without forwarding at least a portion of the payload information. For example, after the separated header information 126 is forwarded to the mapping component 104 for additional processing, without one or more portions of the payload 124 being forwarded with the header 126. The mapping component 104 can be a general purpose processor for processing header and payload data, a specialized processor for processing header data, and/or a cache with pre-processed transforming instructions and mapping information based on previously processed header information.

At 670, transforming instructions (e.g., 210) and mapping information (e.g., 212, . . . , 214) are receiving from the mapping component (e.g., 104). At 675, the payload information is transformed based on the transforming instructions. For example, if the transforming instructions 210 include an erasure code, the erasure coding block 120 may erasure code the payload 124 using the erasure code 210 received from the mapping component 104. In this regard, the payload 124 may be separated into segments 1, . . . , N during the erasure coding. At 680, the payload information is stored in one or more storage locations (e.g., 261, . . . , 263) based on the received mapping information (e.g., one or more addresses of such storage locations).

In some embodiments, the packet offloading service 105 can be a web service and the storage devices can be server computers that communicate with the web service. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. In some instances, the functionalities described herein (e.g., the functionalities described in FIGS. 5A-6B) need not be in a service provider environment and may be done on servers outside of a service provider, such as private or local servers.

Figure 7:
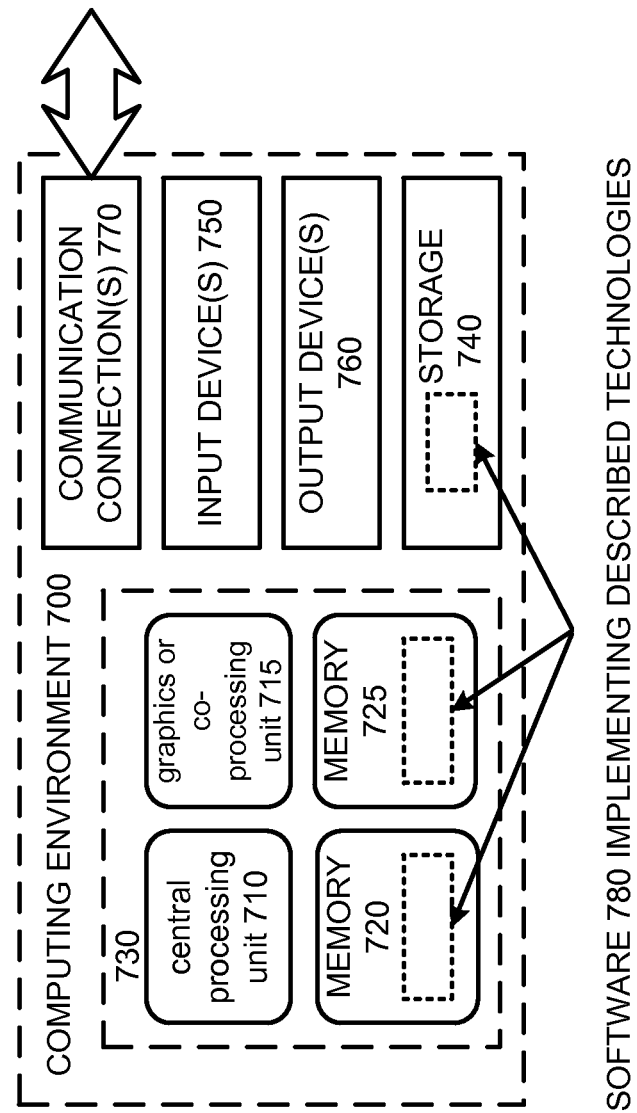
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for processing packet data in a service provider environment, the method comprising:
by a network-enabled offload engine device within a server computer of the service provider environment:
receiving packet data comprising header information and payload information;
separating the header information from the payload information;
forwarding the separated header information to a general purpose processor of the server computer for processing, without forwarding at least a portion of the payload information;
receiving from the general purpose processor an erasure code for encoding the payload information and at least one address of one or more storage locations, the erasure code based at least in part on the header information;
erasure coding the payload information based on the erasure code received from the general purpose processor; and
storing the erasure coded information in the one or more storage locations based on the at least one address.

2. The method according to claim 1, wherein the one or more storage locations comprise an internal storage within the server computer.

3. The method according to claim 1, wherein the one or more storage locations comprise a network storage location.

4. The method according to claim 1, wherein the at least one address is associated with mapping based at least in part on the header information.

5. The method according to claim 1, wherein the erasure coding further comprises
separating the payload information into a plurality of segments based on the erasure code.

6. A computer-readable storage medium including instructions that upon execution cause a computer system to:
in a network-enabled data processing device:
separating header information from payload information of received packet data;
forwarding the header information to a mapping component for separate processing, without forwarding at least a portion of the payload information;
receiving from the mapping component erasure code instructions for encoding the payload data, the erasure code instructions based at least in part on the header information, and mapping information;
erasure coding the payload data based on the erasure code instructions received from the mapping component; and
storing the payload data in one or more storage locations based on the received mapping information.

7. The computer-readable storage medium according to claim 6, wherein the mapping component comprises a cache memory, and the instructions upon execution further cause the computer system to:

determine whether the mapping information associated with the separated header information is available within the cache memory; and
if the mapping information is available, access the mapping information without forwarding the header information.

8. The computer-readable storage medium according to claim 6, wherein the mapping component comprises at least one of:
a general purpose processor configured to process at least the header information;
a special purpose processor configured to process at least the header information; or
a cache memory storing at least pre-determined mapping information.

9. The computer-readable storage medium according to claim 6, wherein the mapping information comprises at least one address of the one or more storage locations.

10. The computer-readable storage medium according to claim 9, wherein the at least one address is associated with a logical-to-physical address mapping based on the header information.

11. The computer-readable storage medium according to claim 6, wherein the erasure coding
further comprises separating the payload information into a plurality of segments based on the erasure code instructions.

12. The computer-readable storage medium according to claim 11, wherein the erasure code instructions further cause the computer system to
generate a new header for each of the plurality of segments.

13. The computer-readable storage medium according to claim 12, wherein the new header comprises at least one of:
a User Datagram Protocol (UDP) header;
a Transmission Control Protocol/Internet Protocol (TCP/IP) header; and
an InfiniB and (TB) header;
a Non-Volatile Memory Express (NVMe) header; or
a storage protocol header.

14. A system for processing packet data, the system comprising:
a plurality of computers, including at least a first general purpose computer, coupled together through a network, at least a portion of the computers for executing a plurality of storage volumes; and
a packet offloading component communicatively coupled to the plurality of computers, the packet offloading component operable to:
separate header information from payload information of received packet data;
forward the header information to the first general purpose computer for separate processing, without forwarding at least a portion of the payload information;
receive from the first general purpose computer, based at least in part on the header information, payload information transforming instructions for transforming the payload information, and mapping information, wherein the payload information transforming instructions are selected based on the header information from a plurality of potential payload information transforming instructions, wherein the first general purpose computer is configured to obtain the mapping information using a mapping component that is external to the first general purpose processor;

transform the payload information based on the payload information transforming instructions received from the first general purpose computer; and store the transformed payload information in one or more storage locations based on the received mapping information.

15. The system according to claim 14, wherein the payload information transforming comprises erasure coding, the payload information transforming instructions comprise erasure coding data, and the packet offloading component is further operable to:

separate the payload information into a plurality of segments based on the erasure coding data.

16. The system according to claim 15, wherein the packet offloading component is further operable to:

generate a new header for each of the plurality of segments, wherein the new header comprises at least one of:

a User Datagram Protocol (UDP) header;

a Transmission Control Protocol/Internet Protocol (TCP/IP) header; and an InfiniB and (TB) header;

a Non-Volatile Memory Express (NVMe) header; or a storage protocol header.

17. The system according to claim 16, wherein the packet offloading component is further operable to:

encrypt the plurality of segments and the new header for each of the plurality of segments.

18. The system according to claim 17, wherein the packet offloading component is further operable to:

direct storage of the plurality of encrypted segments in the at least one storage volume based on the at least one address associated with the mapping information.

* * * * *